(12) United States Patent
Chang et al.

(10) Patent No.: US 11,900,247 B2
(45) Date of Patent: Feb. 13, 2024

(54) SOLAR IRRADIATION PREDICTION USING DEEP LEARNING WITH END-TO-END TRAINING

(71) Applicant: Siemens Aktiengesellschaft, Munich (DE)

(72) Inventors: Ti-chiun Chang, Princeton Junction, NJ (US); Patrick Reeb, Adelsdorf (DE); Joachim Bamberger, Stockdorf (DE); Kuan-Chuan Peng, Plainsboro, NJ (US); Jan Ernst, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 574 days.

(21) Appl. No.: 17/047,434

(22) PCT Filed: May 31, 2018

(86) PCT No.: PCT/US2018/035306
§ 371 (c)(1),
(2) Date: Oct. 14, 2020

(87) PCT Pub. No.: WO2019/231448
PCT Pub. Date: Dec. 5, 2019

(65) Prior Publication Data
US 2021/0158010 A1    May 27, 2021

(51) Int. Cl.
*G06N 3/08*   (2023.01)
*G06N 3/049*  (2023.01)

(52) U.S. Cl.
CPC .............. *G06N 3/08* (2013.01); *G06N 3/049* (2013.01)

(58) Field of Classification Search
CPC ................................. G06N 3/08; G06N 3/049
USPC .......................................................... 382/100
See application file for complete search history.

(56) References Cited

U.S. PATENT DOCUMENTS

| 11,588,437 | B2 * | 2/2023 | Roy | H02J 3/381 |
| 2013/0152997 | A1 * | 6/2013 | Yao | F24S 50/00 136/246 |
| 2015/0302575 | A1 * | 10/2015 | Sun | G06T 7/70 382/103 |
| 2019/0064392 | A1 * | 2/2019 | Feng | G06Q 50/06 |
| 2020/0364554 | A1 * | 11/2020 | Wang | G06T 7/11 |

FOREIGN PATENT DOCUMENTS

WO    2019231448 A1    5/2019

OTHER PUBLICATIONS

International Search Report dated Mar. 6, 2019; International Application No. PCT/US2018/035306; 13 pages.
(Continued)

*Primary Examiner* — Gabriel I Garcia

(57) ABSTRACT

Deep learning is used to train a neural network for end-to-end prediction of short term (e.g., 20 minutes or less) solar irradiation based on camera images and metadata. The architecture of the neural network includes a recurrent network for temporal considerations. The images and metadata are input at different locations in the neural network. The resulting machine-learned neural network predicts solar irradiation based on camera images and metadata so that a solar plant and back-up power source may be controlled to minimize output power variation.

12 Claims, 5 Drawing Sheets

(56) References Cited

OTHER PUBLICATIONS

M. Abdel-Nasser, K. Mahmoud: "Accurate photovoltaic power forecasting models using deep LSTM-RNN" Neural Computing and Applications, Oct. 14, 2017 (Oct. 14, 2017), XP055561491 / Oct. 14, 2017.
Y. Li et al: "Learning to disambiguate by asking discriminative questions", Proceedings of the 2017 IEEE International Conference on Computer Vision (ICCV 117), Oct. 22, 2017 (Oct. 22, 2017), pp. 3439-3448, XP033283213 / Oct. 22, 2017.
X. Shi et al: "Convolutional LSTM network: a machine learning approach for precipitation nowcasting", arXiv:1506.04214v2, Sep. 19, 2015 (Sep. 19, 2015), XP055368436 / Sep. 19, 2015.
Q. Jin et al: "Generating natural video descriptions via multimodal processing", Proceedings of Interspeech' 16, Sep. 8, 2016 (Sep. 8, 2016), pp. 570-574, XP055462879 / Sep. 8, 2016.

\* cited by examiner

SOLAR IRRADIATION PREDICTION USING DEEP LEARNING WITH END-TO-END TRAINING

CROSS REFERENCE TO RELATED APPLICATIONS

This application is a national phase filing under 35 U.S.C. § 371 of International Patent Application No. PCT/US2018/035306, filed May 31, 2018, which is incorporated herein by reference in its entirety.

BACKGROUND

The present embodiments relate to predication of solar irradiation. Cloud coverage of the sunlight determines the stability and efficiency of a photovoltaic power station. Cloud coverage variation results in unstable irradiation. Since back-up power sources require time to bring on line, a blackout or energy loss may occur without an accurate prediction of solar irradiation to plan for any short-term (e.g., minutes) need for back-up power. Unfortunately, the cloud dynamics in a local area and within a short time horizon (e.g., 20 minutes) may not be accurately predicted by a computational model.

A camera-based system has the potential to fulfill the need by taking sky pictures every few seconds. From a sequence of sky images, a person may be able to predict how likely it is that clouds would occlude the sun. Unfortunately, estimation of the cloud coverage from a human being is qualitative. A person may not accurately predict the solar irradiation quantity used by a hybrid power optimizer (HPO) to control the power generation. A conventional image processing algorithm that performs analytics on the sequence of images may provide cloud coverage forecast but may have no reliable ground to correlate the images with future irradiation. This is because irradiation varies largely with the time of the day, day of the year, and many other subtle astronomical and meteorological conditions.

SUMMARY

By way of introduction, the preferred embodiments described below include methods, systems, instructions, and computer readable media for solar irradiation prediction. Deep learning is used to train a neural network for end-to-end prediction of short term (e.g., 20 minutes or less) solar irradiation based on camera images and metadata. The architecture of the neural network includes a recurrent network for temporal considerations. The images and metadata are input at different locations in the neural network. The resulting machine-learned neural network predicts solar irradiation based on camera images and metadata so that a solar plant and back-up power source may be controlled to minimize output power variation.

In a first aspect, a system is provided for solar irradiation prediction. A camera is positioned to capture a sequence of images of a sky. An image processor is configured to receive the images and predict the solar irradiation from sequential input of the images to a machine-learned neural network. The machine-learned neural network has a convolutional layer concatenated with a following recurrent layer. A controller is configured to control supply of energy from a solar plant and a back-up power source based on the predicted solar irradiation.

In a second aspect, a method is provided for solar irradiation prediction for a power system. Images of a sky region are captured, and time of day, date, or time of day and date are determined. The solar irradiation on a solar plant is predicted with a machine-trained deep network architecture. The deep network architecture has a convolutional network to which the images are input in sequence, a recurrent network receiving an output of the convolutional network, and a dense layer receiving an output of the recurrent network and the time of day, the date, or the time of day and the date for the predicting. The solar plant is controlled based on the predicted solar irradiation.

In a third aspect, a method is provided for machine training for solar irradiation prediction. Images are obtained from a camera of a sky, and measures of the solar irradiation are obtained for each of the images. Deep learning is performed with a neural network from the images and the measures of the solar irradiations. The neural network includes a recurrent network. The deep learning trains the neural network to provide the predictions. The trained neural network is stored.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIGS. 5A-7A show example images of a sky region, and FIGS. 5B-7B illustrate predicted solar irradiation verses actual solar irradiation.

DETAILED DESCRIPTION OF THE DRAWINGS AND PRESENTLY PREFERRED EMBODIMENTS

End-to-end solar irradiation prediction uses deep learning. A cascade of convolution and recurrent neural network (CNN+RNN) or convolutional RNN takes as inputs an image sequence. Metadata (e.g., time of the day, day of the year, the irradiation in the past, and/or other information) is input to the network separately from the image, and the network predicts the irradiation for the desirable future time horizon. Because the framework inputs images and other interpretable data as input and directly predicts solar irradiance without any manually programmed feature extraction step, end-to-end solar irradiation prediction is provided.

Figure 1:
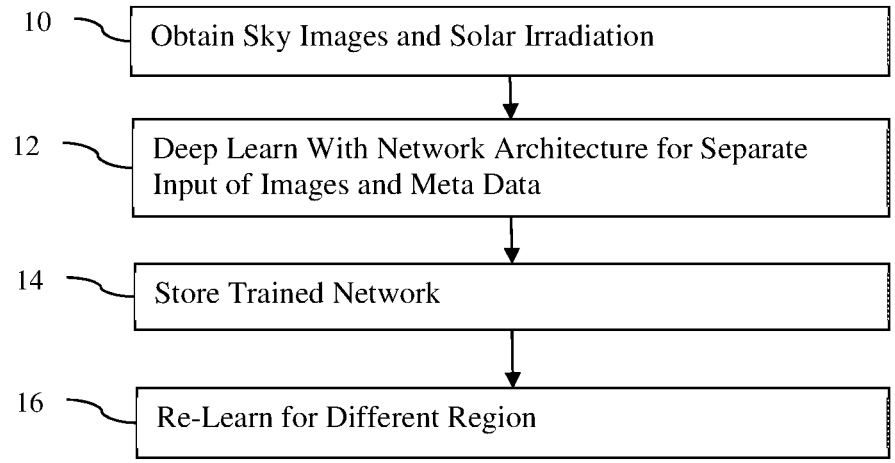
FIG. 1 is a flow chart diagram of one embodiment of a method for machine training for solar irradiation prediction.

FIG. 1 shows one embodiment of a method for machine training for solar irradiation prediction. The training uses deep learning to perform regression as a solar irradiance predictor. Solar irradiance within a short time horizon (e.g., 20 minutes or less) is learned using a deep network architecture. This short-term irradiance mainly depends on cloud coverage of the sun, and cloud dynamics may not be predicted by meteorology data in this time frame due to irregular cloud appearance, motion, and deformation. The deep learning trains the neural network to predict solar irradiance despite these difficulties.

The method is implemented by a machine, database, camera, and/or sensors. A camera and/or other sensors gather images of the sky and ground truth solar irradiation measures. The training data (e.g., ground truth measures and images, with any metadata) are stored in the database. The machine, such as a processor, workstation, server, controller, or other image processor, trains a defined neural network architecture based on the training data in the database.

The acts are performed in the order shown (i.e., top to bottom or numerical order) or other orders. Additional, different, or fewer acts may be provided. For example, act 16 is not provided. As another example, act 12 is performed using an already created database of training data. In yet another example, acts for defining the neural network architecture, activating the training, selecting training data, testing the machine-learned network, and/or controlling the learning are provided.

In act 10, training data is obtained. For machine training, hundreds, thousands, or millions of samples with ground truth are used. Since a yearly cycle is possible, the training data may be for samples from one or more years of data collection. The samples include the ground truth solar irradiation as well as the data from which the machine learns to predict the ground truth, such as images of the sky and metadata.

The training data is gathered from sensors. Image of the sky are captured by one or more cameras. The camera or cameras capture images of the sky for a region, such as above a solar plant. Different cameras may be focused to different parts of the sky. Alternatively or additionally, a fish-eye lens is used to image a larger region of the sky. The images include cloud cover, if there are clouds at the time. Multiple sequences of cloud cover images are acquired. Any sampling frequency, such as every 15, 30, or 60 seconds, may be used for each sequence. The images may be masked or cropped to remove ground-based obstructions.

Any metadata may be obtained. For example, the camera includes a controller that captures the image as well as the time of day and/or date. Another processor may tag each image with time and/or date. Past solar irradiation measures, such as from a sensor, may be used. Previous predictions of solar irradiation may be obtained. Cloud speed may be obtained, such as determining speed from segmenting and tracking clouds in the images. The angle, position, or other solar information relative to the date and time may be gathered or segmented from the images. Weather information, such as humidity, cloud coverage, weather pattern, pressure, and/or solar information, may be obtained from a weather service via a network or look-up. Information from a meteorological model used for longer term (e.g., over 20 minutes) prediction of solar irradiation may be received from the model.

The ground truth is obtained. The neural network is to be trained to predict solar irradiation, so measures of solar irradiation for each of the times at which an image is captured are obtained. A solar irradiation sensor, such as a pyranometer or photovoltaic cell, measures the solar irradiation. In other embodiments, solar irradiation is derived from other information, such as energy output from a solar cell or an atmospheric model fit to the images of cloud cover.

The images and other data are obtained for a given geographical region, such as for a location of a solar plant. Alternatively, the training data is acquired for two or more different regions so that the training learns to predict even with geographical variation in cloud coverage and/or horizon.

Different instances of training data is gathered using the same camera or cameras, solar irradiation sensors, and/or other sources of metadata. Since the training data is gathered over time, the camera, sensors, and/or other sources may have drift in the measurements. Where different cameras, sensors, and/or other sources are used, the images, measures, or metadata may be subject to variance. The images, measures, and/or metadata may be normalized. For example, the measures of solar irradiation are normalized. The values are remapped to a given range.

In act 12, an image processor applies machine learning. An artificial neural network is machine trained to predict solar irradiation, such as solar irradiation in any time increment (e.g., every 30 seconds) for a short time horizon (e.g., 20 minutes). The network is trained to predict based on a sequence of images, metadata, and the ground truth (i.e., training data).

Deep learning is used to train the artificial neural network. Any deep learning approach or architecture may be used. The deep learning trains filter kernels, connections, weights, or other features that, in combination, indicate the solar irradiation from input images and metadata. Rather than or in addition to outputting the solar irradiation, features useable to determine the solar irradiation may be learned using deep learning. The deep leaning provides a deep machine-learned network that outputs the results.

The architecture of the network may include convolutional, sub-sampling (e.g., max or average pooling), fully connected layers, recurrent, softmax, concatenation, dropout, residual, and/or other types of layers. Any combination of layers may be provided. Any arrangement of layers may be used. Skipping, feedback, or other connections within or between layers may be used. Hierarchical structures are employed, either for learning features or representation or for classification or regression.

The architecture may include a convolutional neural network (CNN) or convolution layer. The CNN defines one or more layers where each layer has a filter kernel for convolution with the input to the layer. For example, the image is input to a convolutional layer, which applies a filter kernel to derive an abstraction of the input as the output. Other convolutional layers may provide further abstraction, such as receiving the output from a previous layer and convolving the output with another filter kernel. The machine learning identifies filter kernels that extract features indicative of the solar irradiation.

The architecture may include a recurrent neural network (RNN) or recurrent layer. The RNN defines one or more layers for relating past information to current information. Any recurrent network layers may be used, such as a long short-term memory or gated recurrent unit. The recurrent network works with an input sequence so that information from the past inputs or abstractions there from is used in a current prediction. The machine learning identifies the relationship of input information and stored information to output information. The information to store, relationship, and/or other characteristics of the RNN are learned.

The architecture may include one or more dense layers. The dense layers connect various features from a previous layer to an output from the layer. In one embodiment, the dense layers are fully connected layers. One or more fully connected layers are provided. The dense layers may form a multi-layer perceptron.

In one embodiment, a CNN is concatenated with a RNN. The RNN follows the CNN with no or one or more intervening layers. The CNN applies one or more filter kernels to provide any amount of abstraction. The RNN receives the features abstracted by the CNN. Based on past information from previous inputs of one or more images (i.e., past output of the CNN), the RNN uses the current output of the CNN to derive an output of the RNN. In the concatenated convolutional and recurrent neural network (CNN+RNN), each input image in a sequence of images is fed into the CNN for efficient feature extraction. The RNN, such as a long short-term memory (LSTM), provides for feature sequence analysis. With LSTM, the network amounts to infinite layer capacity. The network may "memorize" past information and, together with new input, make classification or prediction that accounts for the intrinsic dynamics of the data (i.e., change in image over time). For training, the RNN requires a relatively small amount of data for training, as compared to other deep structures that are equipped with hundreds of million parameters. In another embodiment, a fully connected LSTM (FC-LSTM) is used. In yet other embodiments, FC-LSTM is altered to have convolutional structures in both the input-to-state and state-to-state transitions (i.e., convolutional LSTM (ConvLSTM)) is used.

In an embodiment, the metadata is input to the network at a different location (e.g., different layer) in the architecture than the image. Heterogeneous information, such as prior knowledge (e.g., sun location, time of the day, past solar irradiance, etc.), and images are input into a seamless framework of deep networks. The metadata is input to the RNN, one or more dense layers, or another layer. The RNN outputs to the one or more dense layers as well. The image is input to the CNN, which feeds output to the RNN. The architecture combines features from the sequence of images as inputs with the metadata to one or more other layers (e.g., dense or fully connected layers) to predict the solar irradiation. The multiple input structure at different layers allows for layers separately suited for image or metadata. Other layers, such as pooling layers, may receive the metadata. Another layer may be provided between the image input and the CNN. Alternatively, the metadata is input to the network at a same layer as the image.

Figure 2:
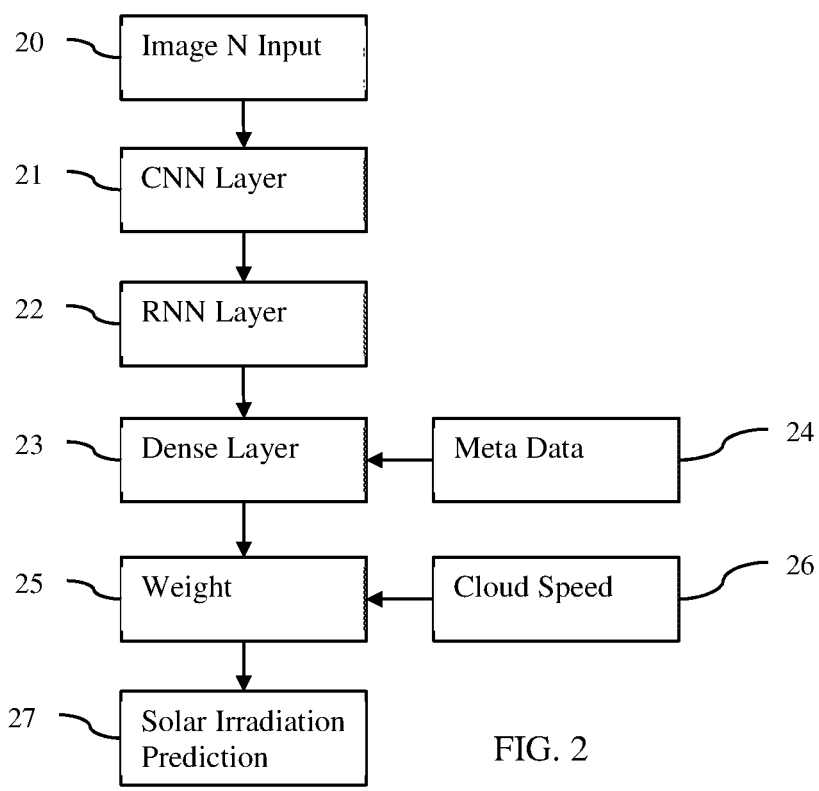
FIG. 2 illustrates an example architecture for an artificial neural network for prediction of solar irradiation.

FIG. 2 shows an example artificial neural network architecture to be trained for the regression. The neural network has two parts: sequence feature extraction and acceleration prediction. For the first task, an image 20 in a sequence of N images in input to a CNN 21. The feature vector output by the CNN 21 and the metadata 24 are passed to the RNN 22, such as stacked long-short-term-memory (LSTM) layers with 1000 or other number of hidden units or gated recurrent units. The output of the RNN 22 is then put through a linear dense layer 23. The dense layer 23 may also receive the metadata 24. The dense layer 23 outputs the prediction, such as a vector of predictions for different future times in a future period (e.g., short time horizon, for example, 20 minutes).

The architecture accommodates different lengths of output sequences. Depending on the speed of the clouds, the period and/or number of times for which the network is trained to predict may be different. In FIG. 2, the cloud speed 26 is input to a weighting function 25. The weighting function 25 keeps or removes predictions of the prediction vector from the dense layer 23. For example, the full output vector includes irradiation values for 40 times representing predictions every 30 seconds for the future 20 minutes. Where the cloud speed is above a given amount, the clouds at an edge of a given image may pass between the sun and the camera in less than 20 minutes (e.g., in 12 minutes), so predictions for times beyond then may not be accurate. The weighting function 25 uses the cloud speed 26 to remove the predictions for later times (e.g., last 8 minutes).

In one embodiment, the weighting function 25 and cloud speed 26 are manually programmed operations that operate on the output of the neural network, so are not involved in training. In other embodiments, the weighting function 25 is implemented as part of the neural network, such as being one or more pooling or fully connected layers. Similarly, the cloud speed 26 may be metadata determined from cloud tracking in images or weather data or may be a CNN with or without other layers that receives the images or output from other CNN 21 and/or RNN 22 and the metadata 24 (e.g., time of day) to derive the cloud speed 26 or abstraction representing cloud speed 26. The cloud speed may be input to the RNN or other layer.

There may or may not be intervening layers at any point in the architecture. Different arrangements are possible, such as the metadata being input to a separate CNN, which then outputs to the dense layers 23. Different metadata may be provided to different layers.

For deep learning using the defined neural network architecture, the network layers are jointly trained. The CNN, RNN, and/or dense layers are jointly trained, but sequential or separate training may be used. The network is trained for any number of epochs (e.g., 300) using any optimization, such as Adam, a learning rate of 0.0001, and/or mean-squared error loss (e.g., L1). Other arrangements, layers, units, activation functions, architectures, learning rates, optimizations, loss function, and/or normalization may be used. Any number of pooling layers may be used. Other architectures dealing with sequential inputs may be used.

The training identifies kernels, recurrent relationships, weights, connections, and/or other information of the architecture relating the input image sequence and metadata to the ground truth solar irradiation. This deep learning trained neural network is stored in act 14. Once trained, the machine-learned artificial neural network predicts solar irradiation given a sequence of images and metadata.

The training is for a region, such as a sky region for a given solar plant. Rather than collect training data and separately train for different solar plants subject to different weather patterns, the trained network may be adapted for other regions. The adaptation may be for a same region but for other periods.

The neural network adapts over time and/or over new sequences of images acquired from different locations in the world and/or different periods. For an original location, all the training data are prepared from images and pyranometry values (i.e., solar irradiation) acquired over several years, so there is enough data to train the network from scratch. For a new region, additional training data from a different camera and pyranometer are acquired over a shorter time (e.g., days or weeks). When a new system is deployed, the camera may be different, leading to different image appearances. Astronomical and meteorological conditions may be different. Even the cloud dynamics may be different. These and/or other factors may result in inaccurate prediction because the network training is based on exiting data from the original region.

In act 16, transfer or incremental learning are used to adapt the network to the new region. For transfer learning, the network as trained for the other region provides initial values (e.g., kernels, weights, and/or connections). Training data for the new region is gathered over a period (e.g., days, weeks, or months). The network is trained using just the new training data for the new region but starting with the initial values for the network trained for the old region. The training data collection for the new region may be on-going. As time goes, more data becomes available. Incremental learning adaptively refines the network parameters so that the prediction accuracy improves over time. Alternatively, the training data from the old region and training data from the new region are combined and used to incrementally learn the network parameters.

Figure 3:
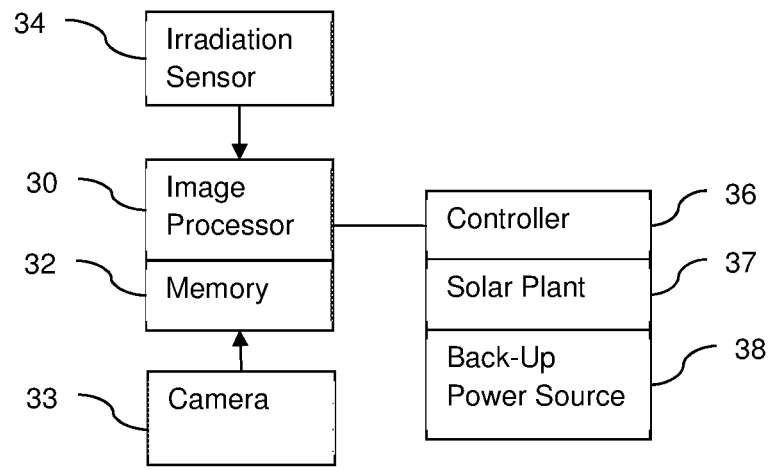
FIG. 3 is a block diagram of one embodiment of a system for solar irradiation prediction.

FIG. 3 shows one embodiment of a system for solar irradiation prediction. A deep-trained neural network is applied. The concatenation of convolutional and recurrent layers in the problem of solar irradiance prediction provides accurate predication of solar irradiation in a relatively short time window (e.g., 20 minutes) based on images of the sky. The concatenation facilitates optimized feature extraction.

Figure 4:
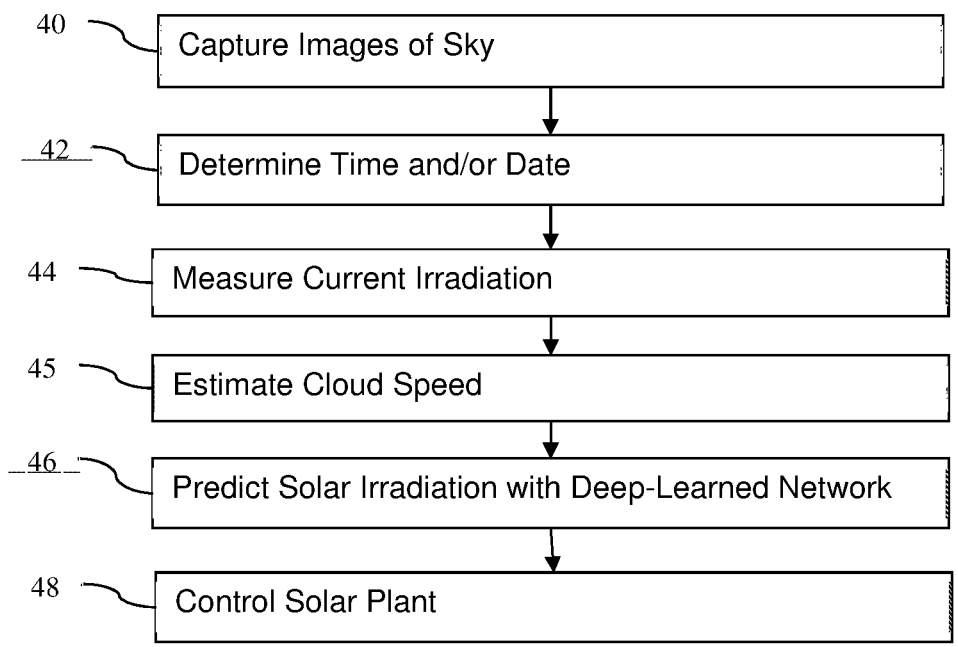
FIG. 4 is a flow chart diagram of one embodiment of a method for solar irradiation prediction in a solar power system.
Figure 5A:
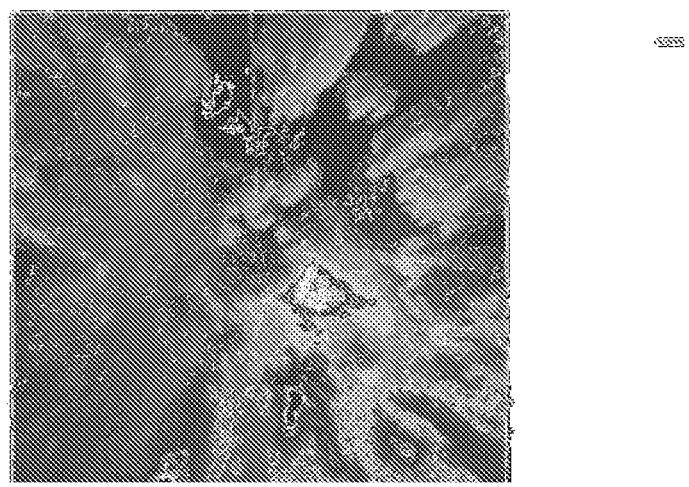
Figure 5B:
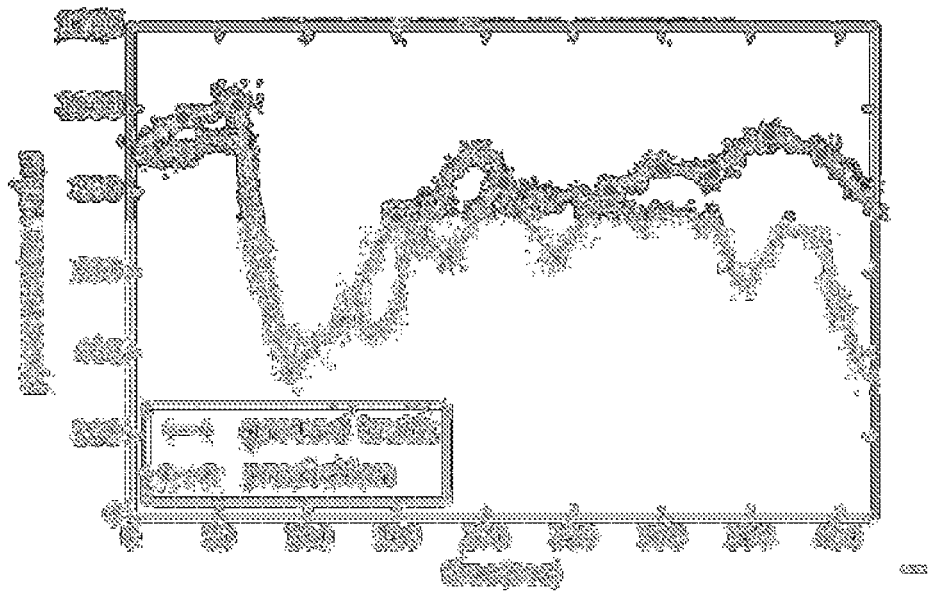
Figure 6A:
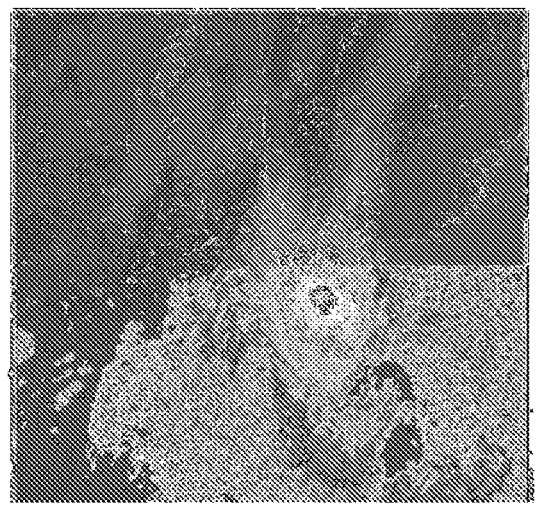
Figure 6B:
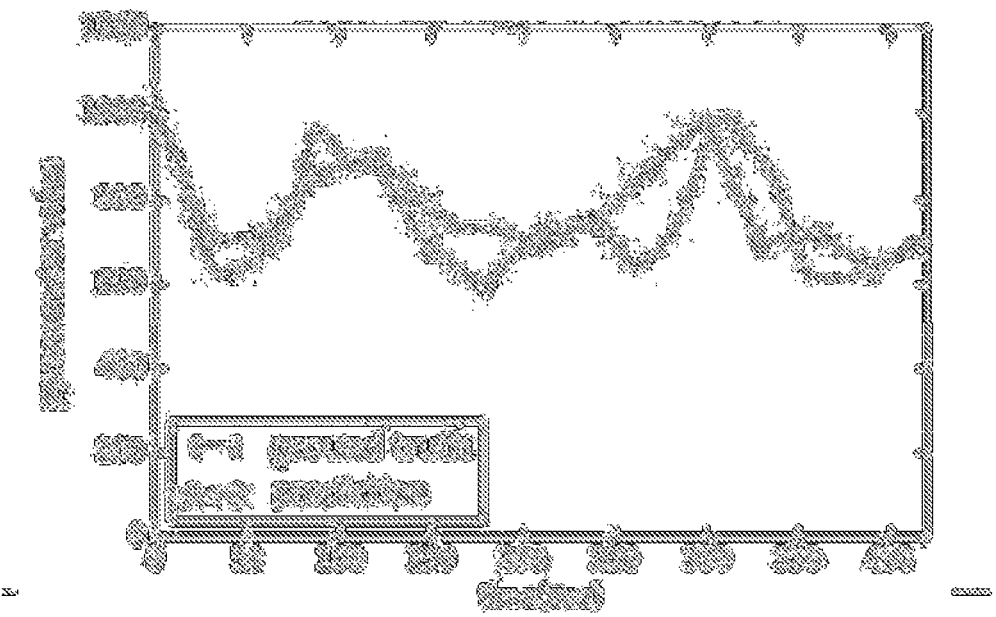
Figure 7A:
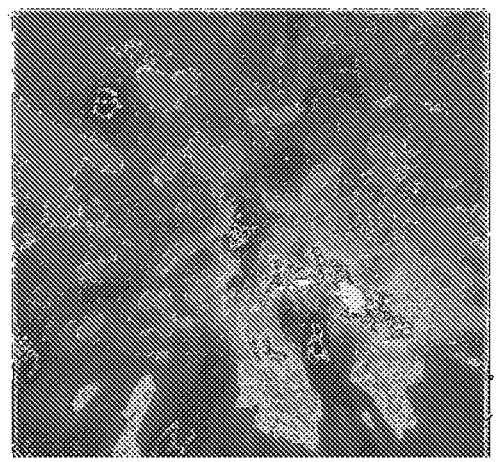
Figure 7B:
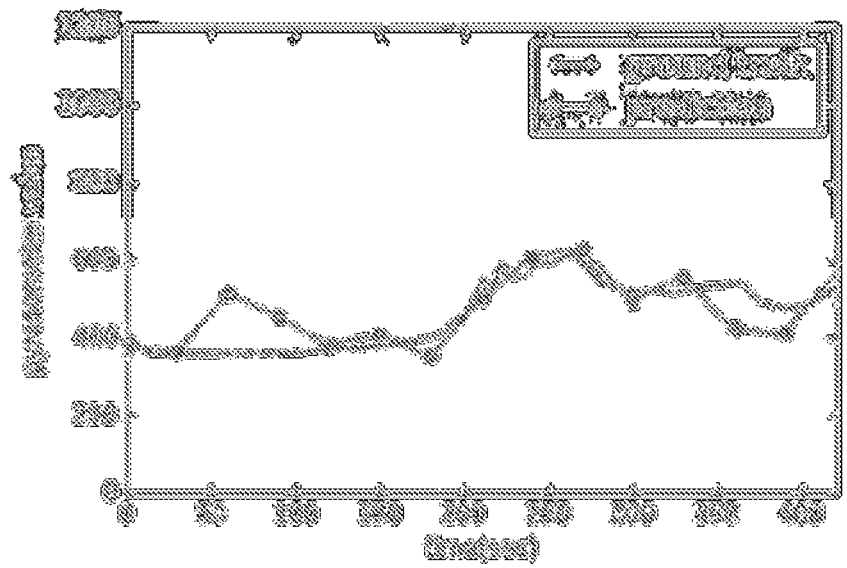

The system implements the method of FIG. 4, but other methods may be implemented. In other embodiments, the system is used for training, such as implementing the method of FIG. 1. Other methods or acts may be implemented.

The system includes an image processor 30, a memory 32, a camera 33, an irradiation sensor 34, a controller 36, a solar plant 37, and/or a back-up power source 38. Additional, different, or fewer components may be provided. For example, a network or network connection is provided, such as for networking the camera 33 and sensor 34 with the image processor 30 and/or the image processor 30 with the controller 36. In another example, more than one camera 33 and/or sensor 34 are provided. In yet other examples, other memories, a computer network, and/or interface are provided for receiving metadata. As another example, the controller 36, solar plant 37, and/or back-up power source 38 are not provided.

The image processor 30 and/or memory 32 are part of the controller 36. Alternatively, the image processor 30 and/or memory 32 are part of a separate computer, workstation, or server. The image processor 30 and/or memory 32 may be provided without the sensor 34 and/or camera 33, such as where previously obtained data are stored as training data in the memory 32.

The camera 33 is a charge coupled diode (CCD) camera. Other optical cameras may be used. One camera is provided, but an array of cameras capturing the same or different parts of the sky may be used. The camera has any field of view. In one embodiment, a fish-eye lens is provided to extend the field of view close to the horizon in a 360-degree arc around the horizon.

The camera 33 is positioned at the solar plant 37. For example, the camera 33 is positioned on a tower with a center of the field of view directed straight upward (i.e., normal to the earth or parallel to gravity). Other locations or positions may be used. The camera 33 is positioned to capture images of at least part of the sky. Ground-based objects may be physically or electronically masked from captured images. Non-cloud objects in the sky (e.g., birds or planes) may be removed or reduced by filtering or segmentation.

The irradiation sensor 34 is a pyranometer or photovoltaic cell. An array may be used. The irradiation sensor 34 is positioned at the solar plant 37, such as adjacent or on one or more solar panels. Other positions, such as on a tower by the camera 33, may be used. The irradiation sensor 34 measures a current irradiation.

The memory 32 is a graphics processing memory, a video random access memory, a random-access memory, system memory, cache memory, hard drive, optical media, magnetic media, flash drive, buffer, database, combinations thereof, or other now known or later developed memory device for storing data. The memory 32 is part of the image processor 30, the controller 36, part of a computer associated with the image processor 30, part of a database, part of another system, or a standalone device.

The memory 32 stores the images, metadata, irradiation measures, and/or predicted irradiation. The memory 32 may store other information. For example, the values of the input feature vector, the values of the output vector, the connections/nodes/weights/convolution kernels of the deep machine-learned network, calculated values in applying the network, and/or cloud speed are stored. The image processor 30 and/or controller 36 may use the memory 32 to temporarily store information during performance of the method of FIG. 4.

The memory 32 or other memory is alternatively or additionally a non-transitory computer readable storage medium storing data representing instructions executable by the programmed image processor 30 and/or controller 36. The instructions for implementing the processes, methods and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The image processor 30 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for predicting solar irradiation. In one embodiment, the image processor 30 is an HPO. The image processor 30 is a single device or multiple devices operating in serial, parallel, or separately. The image processor 30 may be a main processor of a computer, such as a laptop, server, or desktop computer, or may be a processor for handling some tasks in a larger system, such as in the controller 36 or solar plant 37. The image processor 30 is configured by instructions, firmware, design, hardware, and/or software to perform the acts discussed herein.

The image processor 30 is configured to receive the images and/or metadata. The images are received from the camera 33 via a wired, wireless, or computer networked interface. The images may alternatively be loaded from the memory 32. Similarly, measures of solar irradiation are received from the sensor 34 but may be loaded from the memory 32. Metadata may be received from any source, such as using a computer network-based date and time or receiving date and time stamps with images from the camera 33. Past measures, images, and/or predictions may be accessed from the memory 32. Other metadata may be obtained form the memory 32 or over a computer network.

The image processor 30 is configured to predict the solar irradiation. The image processor 30 inputs a sequence of images from the camera 33 to a machine-learned neural network. The predictions may be provided by input of the first image. For each image in the sequence, another output vector of predications is output. The outputs may continue as more images of the sequence are input. This sequence may be continuous, such as an image every 30 seconds or every minute all day, every day.

The machine-learned neural network has a convolutional layer concatenated with a following recurrent layer. The images are input to the convolutional layer or a layer that feeds to the convolutional layer. The output of the convolutional layer or layers is to a recurrent layer, such as a long short-term memory. As more than the initial image is input, the recurrent layer uses memory to relate abstractions (i.e., outputs from the convolutional layer or layers) of a current image to abstractions of past images.

The machine-learned neural network also receives the metadata, such as a time of day, date, and solar orbit information. The metadata is input with each of the images. The frequency of the input is the same, such as a time and date being provided with each image. Alternatively, some or all the metadata may be input at a different frequency, such as the date being provided as a look-up that does not change until a new day occurs.

Any metadata may be input. Date, time, past measures of irradiation for the given date and time, current measure of irradiation from the sensor 34, weather information, solar information, and/or cloud speed may be input.

The metadata is input at a same point in the network. For example, the metadata is input to a dense or fully connected layer or layers of the machine-learned network. This dense or fully connected layer also receives the output of the recurrent layer. The output of the convolutional layer may be fed forward, skipping the recurrent layer as well as being output to the recurrent layer. In other embodiments, different metadata is input to different layers of the network. The output of the recurrent network may pass through one or more other layers, such as other fully connected layers, before reaching the fully connected layer or layers into which the metadata is input.

In response to the input of the image and metadata, the machine-learned network outputs a prediction of the solar irradiation. Based on the learned feature extraction, weights, and/or connections, the machine-learned network outputs the prediction.

The prediction is a value for a given future time, such as 10 minutes. In other embodiments, the prediction is a list of values for different future times for a future period (e.g., values representing every 10 seconds over a 15-minute period). Any sample step size (e.g., 5, 10, 15, 30, 60, 90, or 120 seconds) may be used. The future time is from a current time. Any period corresponding to inaccuracy in weather modeling may be used, such as short terms of 20 minutes or less.

The image captured by the camera 33 is immediately input or input with less than 10 second delay. Longer delay may be provided. In response, the predications from the time represented by the image are output (e.g., solar irradiation is predicted for future times that are up to 20 minutes from the time of capture of the image). For short-term cloud coverage prediction, experiments of end-to-end deep learning (i.e., sky image-to-irradiance) show positive feasibility.

The period may vary based on the speed of clouds. The different future times included in the output vector and/or used from the output vector may be based on the cloud speed. The cloud speed in conjunction with the field of view of the camera 33 provides a limit on the amount of time (i.e., future period) for which the predictions are accurate. The predictions beyond that time may be discarded or not used. Binary weights may be applied, such as 1 to maintain and 0 to discard. Given the regular future time sampling and a constant field of view of the camera 33, a length of the list may vary based on the cloud speed. This variation may be incorporated into the network architecture as part of learning or may be a hand coded, post predication process.

The solar plant 37 is one or more photovoltaic cells connected through transformers and/or direct to alternating current converters to a power distribution network. For example, an array of solar panels is provided. The array may be for supplying power to a regional (e.g., county, country, or state) power distribution system or for a distribution system of a facility, complex, or building. The back-up power source 38 is a battery, diesel generator, coal-powered generator, nuclear plant, and/or natural gas power plant.

The controller 36 is a computer, workstation, server, industrial process controller, or other processor or network of processing hardware, such as a hybrid power optimizer (HPO). The controller 36 uses one or more of the predictions to control the solar plant 37 and/or back-up power source 38. The supply of energy from the solar plant 37 and the back-up power source 38 are controlled based on the predicted solar irradiation. A given demand or amount of power is expected in a distribution system. Where the solar plant 37 can supply all the demand, the solar plant 37 is used. Where the solar plant 37 cannot supply all the demand, the back-up power source 38 contributes the short fall to avoid a blackout, brownout, or energy shortfall. The controller 36 balances the supply of energy between the solar plant 37 and the back-up power source 38.

One problem for solar power generation is that output may vary depending on the cloud coverage. Demand, however, may not decline when the solar plant 37 does not produce energy. Another source of power may be put online to cover the shortfall. The back-up power source 38 may be kept running or may be started to contribute power when solar is unable to handle the load. Having the back-up power source 38 online and on-call burns more fuel and costs more money. Accurate prediction of solar irradiation allows the back-up power source 38 to remain offline or in a reduced cost state and be brought online for situations where the solar irradiation will be below a threshold level.

With no cloud coverage, the power output is easy to predict. However, due to cloud coverage, the actual power output is not smooth. The actual power output curve dips and rises at unexpected intervals over the course of the day. At times, the actual power output may be 50% or less of the optimal output for clear skies. To complicate predicting power output, the cloud coverage changes from day-to-day, hour-to-hour, and even minute-to-minute, resulting in variable solar irradiance and variable power output.

The camera 33 monitors the sky near locations of interest (e.g., near a hybrid power plant). The machine-learned network is used to predict the solar irradiation. The predication for a future time or an average over a window of future times may be used to determine whether to bring the back-up power source 38 online. Depending on the type of back-up power source 38 being brought online to cover an energy shortfall of the solar plant 37, different amounts of time may be needed. The predictions are used in an ongoing manner to control the status and/or operation of the back-up power source 38 and thus the solar plant 37. A model of operation of the solar plant 37 responsive to solar irradiation may be used to determine whether the solar plant 37 will supply sufficient power despite short term variation in cloud cover. The results of the analysis are used to warm up, connect, or otherwise arrange to activate the back-up power source 38.

FIG. 4 shows one embodiment of a method for solar irradiation prediction for a power system. Solar irradiation is predicted with a machine-trained deep network architecture for control of a solar plant.

The method uses the system of FIG. 3 or a different system. The acts are performed in the order shown (i.e., top to bottom or numerical) or other order. For example, acts 40, 42, and 44 are performed simultaneously or in any order. Additional, different, or fewer acts may be provided. For example, act 42 or 44 is not performed. As another example, act 48 is not provided.

In act 40, a camera captures images of a sky region. An image is taken periodically, such as every 30 seconds.

In act 42, a processor determines a time of day, date, or time of day and date. The processor determines the time and/or date from a computer network, look-up, or request. Other sources of the date and/or time may be provided, such as an internal clock. Other metadata may be determined.

In act 44, an irradiation sensor measures a current irradiation. The current irradiation may reflect atmospheric, cloud density, or other effects on the solar irradiation. The current irradiation is measured at the same frequency and/or time as the images are captured, but may be at a different frequency or times.

In act 45, a processor estimates cloud speed. The captured images may be used. Given the camera physics and lens information, the distances represented by different pixels is determined. By testing different offsets of one image to another, the time between images and the offset with a greatest correlation indicate the velocity of the clouds. Other calculations may be used, such as detecting or segmenting a same cloud in each image and determining the velocity. In other embodiments, the machine-trained network estimates the cloud speed.

In act 46, a processor predicts the solar irradiation on a solar plant with a machine-trained deep network architecture. The architecture includes a convolutional network to which the images are input in sequence, a recurrent network (e.g., a long short-term memory network) receiving an output of the convolutional network, and/or a dense layer (e.g., one or more fully connected layers) receiving an output of the recurrent network and the metadata (e.g., current irradiation, time of day, the date, or the time of day and the date for the predicting).

In response to input of each image and the metadata, the machine-trained deep network outputs a predication. As additional images are input, the recurrent network stores information from past images to be used in the prediction. The current irradiation may be used as an input by the network to predict the irradiation based on the images and other metadata for future times. The output vector of the predictions in response to input of a given image may be limited. The cloud speed may be used to limit the output vectors to future times with greater accuracy in the prediction.

FIGS. 5A-7A show example images with different amounts of cloud cover. The images are samples from sequence of images. Each of these images is a last image input to provide predications for a plurality of future times. FIGS. 5B-7B show one output prediction vector (i.e., predictions for 14 future times from 30 seconds in the future to 420 seconds at a 30 second interval) after sequential input of a series of images, including the images of 5A-7A, up to time 0. The ground truth from a pyranometer are shown with the predictions. The predictions accurately reflect the irradiation variation in the near future.

In act 48, a controller controls a solar plant based on the predicted solar irradiation. The solar plant is controlled by warming up, bringing on-line, and/or otherwise preparing to use a back-up source where the solar irradiation for a given near future time or range of future times (e.g., in 5 minutes or an average from 3-7 minutes) indicates a level below a threshold. Other processing may be used, such as modeling the solar conversion of the plant based on the predicted irradiation and using the modeled output power as the control.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for solar irradiation prediction, the system comprising:
    a camera positioned to capture a sequence of images of a sky;
    an image processor configured to receive the images and predict the solar irradiation from sequential input of the images to a machine-learned neural network, the machine-learned neural network having a convolutional layer concatenated with a following recurrent layer; and
    a controller configured to control supply of energy from a solar plant and a back-up power source based on the predicted solar irradiation,
    wherein the image processor is configured to predict the solar irradiation as a list of values for different times in a future, the image processor configured to weight the values of the list based on a cloud speed.

2. The system of claim 1 wherein the camera comprises a fish eye lens at the solar plant.

3. The system of claim 1 wherein the image processor is configured to predict where a time of day and date is input to the machine-learned neural network with each of the images.

4. The system of claim 1 wherein the image processor is configured to predict the solar irradiation where a past measure of irradiation is input to the machine-learned neural network.

5. The system of claim 1 wherein the image processor is configured to predict where meta data is input to the machine-learned neural network, the meta data input to a fully connected layer, which also receives an output of the recurrent layer, the images input to the convolutional layer.

6. The system of claim 1 wherein the recurrent layer comprises a long short-term memory.

7. The system of claim 1 wherein the image processor is configured to vary a length of the list based on the cloud speed.

8. The system of claim 1 further comprising an irradiation sensor, wherein the machine-learned network is configured to predict based on input of measured irradiation from the irradiation sensor.

9. The system of claim 1 wherein the image processor is configured to predict the solar irradiation for future times within 20 minutes of the capture of a current one of the images, and wherein the controller is configured to balance the supply between the solar plant and the back-up power source based on the prediction.

10. A method for solar irradiation prediction for a power system, the method comprising:
 capturing images of a sky region;
  determining a time of day, date, or time of day and date;
  predicting the solar irradiation on a solar plant for future times in response to the input of one of the images with a machine-trained deep network architecture, the deep network architecture having a convolutional network to which the images are input in sequence, a recurrent network receiving an output of the convolutional network, and a dense layer receiving an output of the recurrent network and the time of day, the date, or the time of day and the date for the predicting;
  controlling the solar plant based on the predicted solar irradiation; and
  estimating cloud speed, and wherein predicting comprises predicting with the future times limited by the cloud speed.

11. The method of claim 10 wherein predicting comprises predicting with the recurrent network comprising a long short-term memory network and the dense layer comprising a plurality of fully connected layers.

12. The method of claim 10 further comprising measuring a current irradiation, and wherein predicting comprises predicting with the current irradiation input to the dense layer.

* * * * *